United States Patent
Jang et al.

(10) Patent No.: US 9,135,390 B2
(45) Date of Patent: Sep. 15, 2015

(54) METHOD OF DESIGNING POWER SUPPLY NETWORK

(71) Applicant: SAMSUNG ELECTRONICS CO., LTD., Suwon-Si, Gyeonggi-Do (KR)

(72) Inventors: Myung-Soo Jang, Seoul (KR); Jae-Rim Lee, Hwaseong-si (KR); Jong-Wha Chong, Seoul (KR); Jae-Hwan Kim, Seoul (KR); Byung-Gyu Ahn, Seoul (KR); Cheol-Jon Jang, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 14/308,741

(22) Filed: Jun. 19, 2014

(65) Prior Publication Data

US 2014/0380262 A1 Dec. 25, 2014

(30) Foreign Application Priority Data

Jun. 25, 2013 (KR) .................. 10-2013-0073262

(51) Int. Cl.
*G06F 17/50* (2006.01)
*H05K 3/00* (2006.01)

(52) U.S. Cl.
CPC ........ *G06F 17/5077* (2013.01); *G06F 17/5081* (2013.01); *H05K 3/0005* (2013.01)

(58) Field of Classification Search
CPC ..................................................... G06F 17/50
USPC ...................................................... 716/137
See application file for complete search history.

(56) References Cited

U.S. PATENT DOCUMENTS

| | | |
|---|---|---|
| 5,933,358 A | 8/1999 | Koh et al. |
| 6,665,843 B2 | 12/2003 | Frech et al. |
| 6,856,148 B2 | 2/2005 | Bodenstab |
| 7,533,357 B2 | 5/2009 | Carlsen et al. |
| 7,640,523 B1 | 12/2009 | Shi et al. |
| 7,827,511 B2 | 11/2010 | Vaassen |
| 7,969,014 B2 | 6/2011 | Chuang |
| 7,984,397 B2 | 7/2011 | Lin et al. |
| 8,549,460 B2 | 10/2013 | Law et al. |
| 2002/0190255 A1* | 12/2002 | Kitahara et al. ............... 257/69 |
| 2010/0001379 A1 | 1/2010 | Lee et al. |
| 2011/0107283 A1 | 5/2011 | Oh et al. |

FOREIGN PATENT DOCUMENTS

| | | |
|---|---|---|
| JP | 2006-140363 | 6/2006 |
| KR | 1020110004280 A | 1/2011 |

* cited by examiner

*Primary Examiner* — Thuan Do

(74) *Attorney, Agent, or Firm* — Volentine & Whitt, PLLC

(57) ABSTRACT

To design a power supply network of a 3D semiconductor device employing through-silicon-via (TSV) technology, board wiring of each of boards of the device is determined. An initial network structure is created for the boards. A layout of power bumps and through-silicon-vias, using the initial network structure, is produced such that voltages of all nodes of wiring of the boards are greater than a reference voltage. A semiconductor device having boards, power bumps and through-silicon-vias conforming to the layout is fabricated. Thus, the numbers of the through-silicon-vias and the power bumps of the power supply network of the semiconductor device are minimal.

9 Claims, 8 Drawing Sheets

FIG. 8
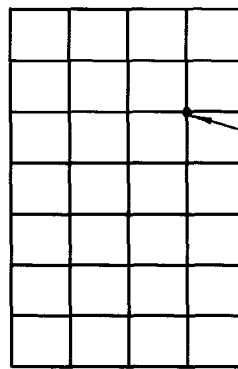
INITIAL POWER BUMP NODE (IPBN)
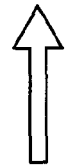
100
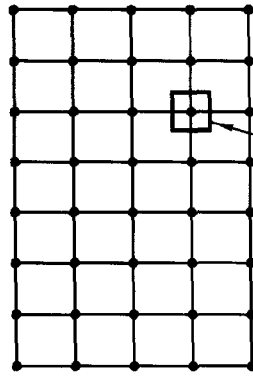
WORST IR-DROP NODE

METHOD OF DESIGNING POWER SUPPLY NETWORK

PRIORITY STATEMENT

This application claims priority under 35 USC §119 to Korean Patent Application No. 10-2013-0073262, filed on Jun. 25, 2013, in the Korean Intellectual Property Office (KIPO), the contents of which are herein incorporated by reference in their entirety.

BACKGROUND

1. Technical Field

The inventive concept generally relates to the manufacturing of semiconductor devices having through-silicon-vias (TSVs). In particular, the inventive concept relates to the designing and fabrication of power supply networks of semiconductor devices having TSVs.

2. Description of the Related Art

Three-dimensional (3D) integrated circuits using through-silicon-via (TSV) technology are being developed to provide semiconductor devices having high degrees of integration. Through-silicon-via (TSV) technology uses through-silicon-vias (TSVs) and horizontal wiring to electrically connect various blocks of electronic devices that are disposed one above the other in the 3D circuit, such as in boards (e.g., dies) that are stacked one atop the other. TSV technology not only result in shorter lengths of electrical wiring than wire bonding technology but also offers higher system performance by reducing electrical parasitic components.

SUMMARY

According to an aspect of the inventive concept there is provided a method of manufacturing a semiconductor device, which includes determining board wiring for each of boards of the device, devising an initial network structure of the boards having the determined board wiring, using the initial network structure to compose a layout of a power supply network, and fabricating a semiconductor device of the board having the determined board wiring and power bumps and through-silicon vias conforming to said layout, and in which the layout of the power supply network has power bumps and through-silicon-vias satisfying a condition in which all of the nodes of the boards have voltages higher than a reference voltage when a voltage is impressed across the boards.

A method of manufacturing a semiconductor device, which includes determining a board wiring for each of a plurality of boards of the device, forming an initial network structure among the boards, composing an original layout of power bumps on one of the boards at nodes of wiring of the board and through-silicon-vias that each connect a node of wiring of one of the boards to a corresponding node of wiring of another of the boards until all of the nodes of the boards have voltages higher than a reference voltage for a case in which a predetermined given voltage is impressed across the boards, rearranging the power bumps and the through-silicon-vias of the original layout to compose a second layout in which deviation among the voltages of the nodes on the boards in the layout is less than in the original layout, and fabricating a semiconductor device of the board having the determined board wiring and power bumps and through-silicon vias conforming to said second layout.

According to still another aspect of the inventive concept there is provided a method of manufacturing a semiconductor device, which includes (a) power network design steps and (b) fabrication based on the design steps, and in which the design steps (a) include (a1) determining a board wiring characteristic for each of a first wiring board and a second wiring board, wherein each of the first and second boards includes a substrate and wiring integral with the substrate, and the wiring of each of the boards includes nodes where wires of the wiring intersect, (a2) creating an initial power network structure of the device including a stack of the first and second wiring boards each having the determined board wiring characteristic, through-silicon-vias each connecting a respective node of the wiring of the first board to a respective node of the second board, and a power bump connected to one of the nodes of the first board, (a3) using the initial power network structure to determine voltages of the nodes of the wiring of the first board, (a4) adding a power bump to the first board of the initial power structure, at one of the nodes of the wiring of the first board, when any of the measured voltages of the nodes of the wiring of the first board is less than a reference voltage, (a5) using the initial power network structure to determine voltages of the nodes of the wiring of the second board, and (a6) adding a through-silicon-via to the initial power network structure when any of the determined voltages of the nodes of the wiring of the second board is less than a reference voltage, and the fabrication (b) includes fabricating a semiconductor device having a power supply network corresponding to the power supply network designed in (a).

BRIEF DESCRIPTION OF THE DRAWINGS

The inventive concept will be more clearly understood from the following detailed description of preferred embodiments made in conjunction with the accompanying drawings.

FIG. 8 is a conceptual diagram of the process of locating the node on which the initial power bump is place in the process of FIG. 7.

DETAILED DESCRIPTION OF THE EMBODIMENTS

Various embodiments and examples of embodiments of the inventive concept will be described more fully hereinafter with reference to the accompanying drawings. Like numerals are used to designate like elements throughout the drawings.

It will also be understood that when an element or layer is referred to as being "on" or "connected to" another element or layer, it can be directly on or directly connected to the other element or layer or intervening elements or layers may be present. In contrast, when an element or layer is referred to as being "directly on" or "directly connected to" another element or layer, there are no intervening elements or layers present.

Other terminology used herein for the purpose of describing particular examples or embodiments of the inventive concept is to be taken in context. For example, the terms "comprises" or "comprising" when used in this specification specifies the presence of stated features or processes but does not preclude the presence or additional features or processes. The term "board" will be understood to mean any of the various components of a semiconductor device that may generally include a substrate and wiring integral with the substrate, such as a die, and may have electronic components/circuits (not shown) connected to the wiring. The term "power bump" will be understood as describing a contact of a semiconductor device dedicated to receive power from an outside source or line Vdd and from which power is fed in the device to an electronic component/circuit requiring the power for its operation.

It should also be noted that the processes of embodiments of methods according to the inventive concept need not necessarily occur in the order indicated by the flowcharts. For example, the processes shown in two blocks in succession may in fact be executed substantially concurrently or the processes may sometimes be executed in the reverse order shown.

Figure 9:
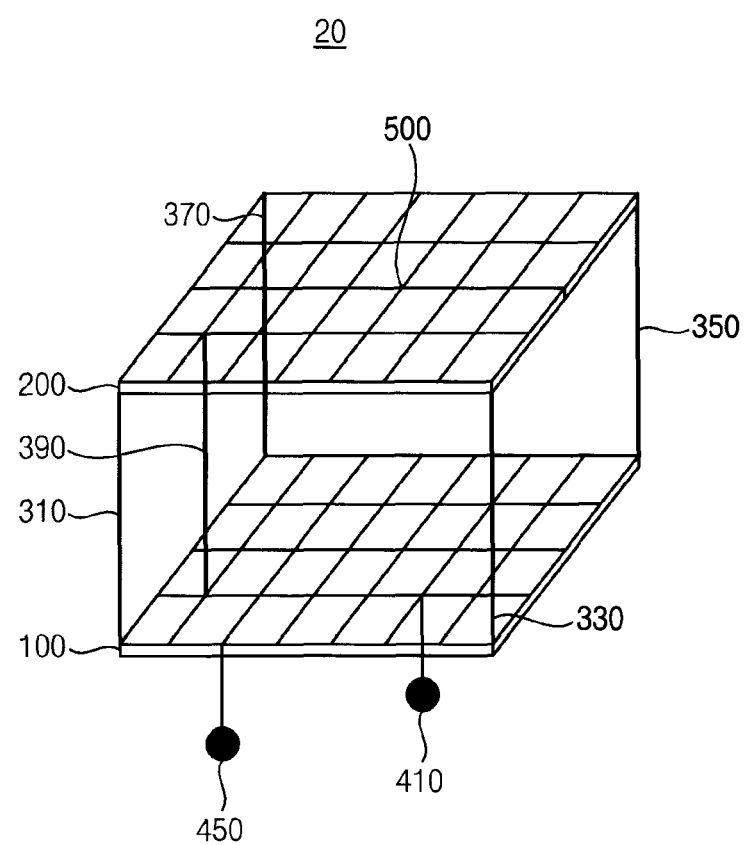
FIG. 9 is a schematic diagram of an example of a semiconductor device having a power supply network designed according to the method of FIG. 1.

An embodiment of a method of manufacturing a 3D semiconductor device according to the inventive concept will be described with reference to an example of a semiconductor device 20 including a first board 100, a second board 200 stacked on the first board, and through-silicon-vias 390 and power bumps 450 of the power supply network of the device (FIG. 9). The boards 100 and 200 are square in the illustrated example but other shapes are possible. Also, in this example, the first board 100 represents the lowest of the boards in the device 20.

Figure 1:
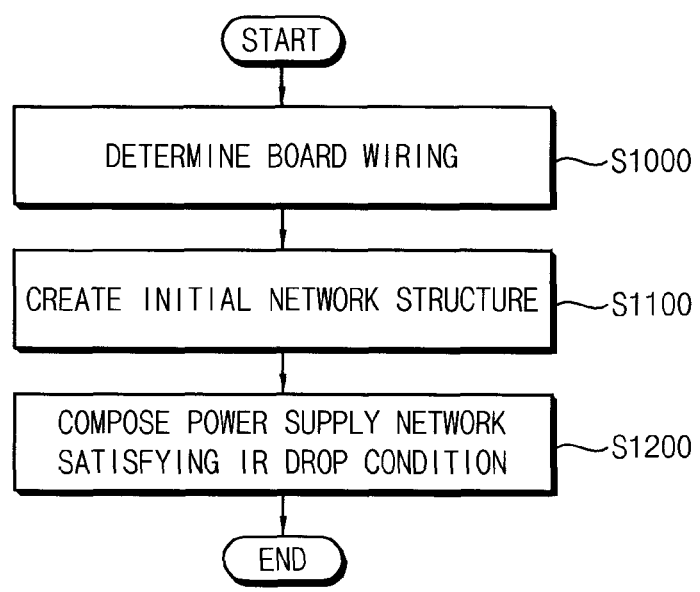
FIG. 1 is a flow chart illustrating a method of designing a power supply network of a semiconductor device according to the inventive concept.

With reference to FIG. 1, a power supply network of the 3D semiconductor device is designed.

In general, board wiring 500 of each of the boards 100 and 200 of the device is determined (S1000). Board wiring 500 may refer to wiring of the board laid out along a grid or lattice. An initial network structure is created for the boards having the board wiring 500 (S1100). Power bumps and through-silicon-vias are arranged to form a power supply network in which all nodes of the boards have voltages higher than a reference voltage (S1200). As the distance between the node on the board and the power bump is increased, the IR-drop between the node on the board and the power bump is increased. If the IR-drop is increased too much, the device may not operate stably. The reference voltage may be set to a lower limit voltage in which the device operates stably. For example, the reference voltage VR may be set to a 95% of a power bump voltage. As described in more detail later on, beginning with the initial network structure, when there exist low voltage nodes NL on the boards (nodes whose voltages are lower than the reference voltage VR), a through-silicon-via 390 or power bump 450 is "placed on" (formed so that it connects to or is formed on) a lowest voltage node WNL (the node whose voltage is lowest among the low voltage nodes NL). After placing a through-silicon-via 390 or power bump 450 on a lowest voltage node, the voltages VN of all of the nodes on the boards may be measured once again and compared to the reference voltage VR and if there are still low voltage nodes, a through-silicon-via 390 or power bump 450 is "placed on" the current lowest voltage node WNL. The process is repeated until the voltages VN of all of the nodes of the boards are higher than the reference voltage VR. A semiconductor device is fabricated such that its power supply network corresponds to the power supply network designed in this way. Accordingly, the numbers of the through-silicon-via 390 and the power bumps 450 of the power supply network in the semiconductor device are minimized.

Figure 2:
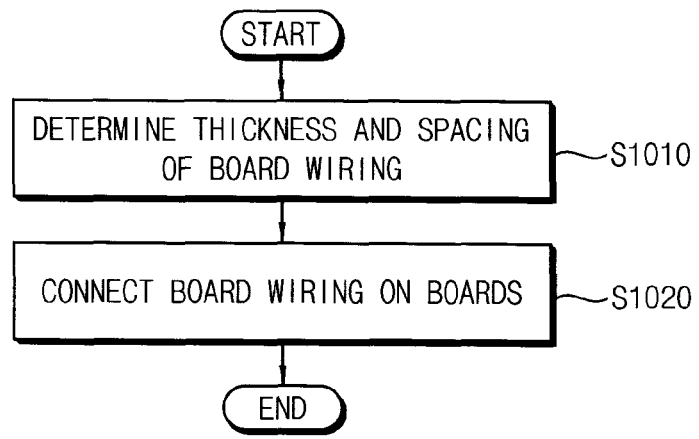
FIG. 2 is a flow chart illustrating an example of a process of determining the board wiring of the semiconductor device in the method of FIG. 1.

An example of the process (S1000) of determining the board wiring in the method of FIG. 1 will now be described in detail with reference to FIG. 2.

The thickness and a spatial interval of the board wiring 500 (FIG. 9) of each of the boards 100 and 200 is determined (S1010). Spatial interval in this example refers to the distance between adjacent rows and adjacent columns of lines that make up the grid or lattice. Then, the board wiring 500 of the boards are connected (S1020).

Figure 3:
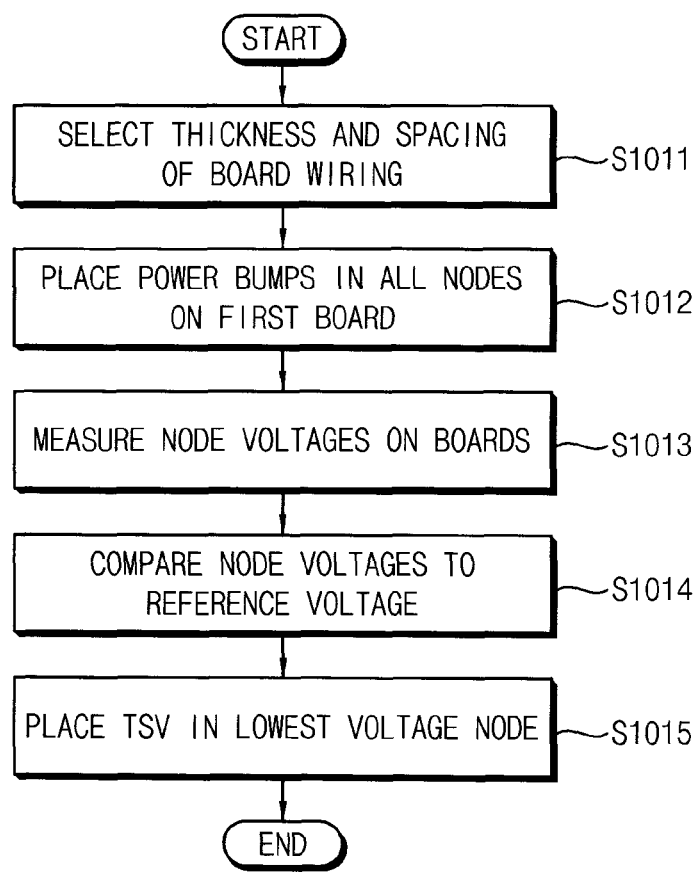
FIG. 3 is a flow chart illustrating an example of a process of determining a thickness and a spatial interval of the board wiring in the process of FIG. 2.
Figure 4:
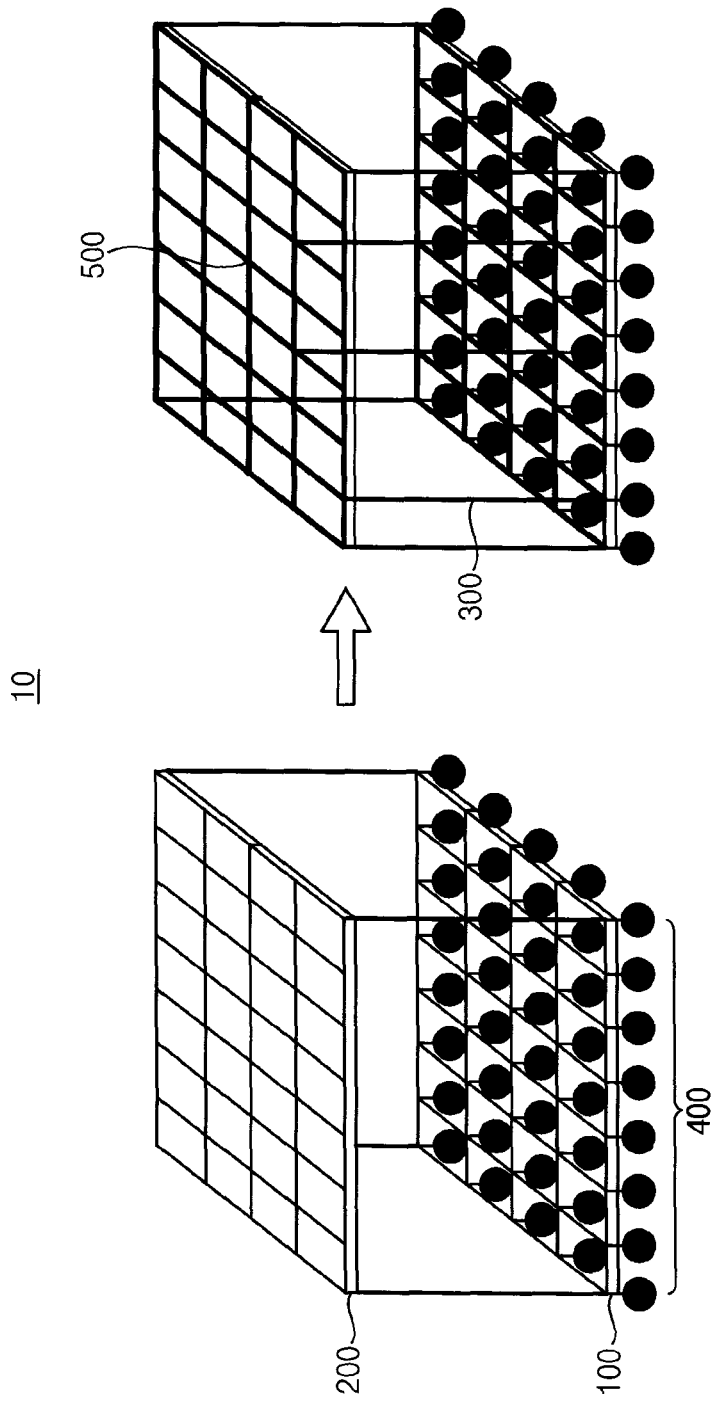
FIG. 4 is a conceptual diagram illustrating the process of FIG. 3.

An example of the process of determining the thickness and spatial interval of the the board wiring (S1010 in FIG. 2) will now be described in detail with reference to FIGS. 3 and 4. FIG. 4 shows a representation 10 of the device during the course of its design.

First, a thickness of the board wiring 500 and spatial interval of the board wiring 500 are selected, for each of the boards, among predetermined sets of values for these features (S1011). That is, one thickness for the wiring and one spatial interval for the wiring of each board are selected from among given sets. The sets of values for the thickness and spatial interval may be limited by the semiconductor device design specifications. For example, the sets of values for the thickness of the board wiring 500 may be limited to values 2 nm apart within a range of 2 nm-30 nm. Likewise, the sets of values for the spatial interval may be limited to values 2 nm apart within a range of 2 nm-30 nm.

Then, virtual power bumps 400 are placed on all nodes of the first board 100 having the selected thickness and spatial interval for the board wiring 500 (S1012). The nodes in this example are the lattice points (points of intersection) of the lattice of the board wiring 500. Also, virtual through-silicon vias 300 are placed at the nodes of the boards at edges of the wiring of the boards 100 and 200, e.g., the four corners of the boards 100 and 200 in the figure. Voltages VN of all of the nodes of the second board 200 are then measured for this virtual structure 10 when a given voltage is impressed across the boards through the virtual power bumps (S1013). A reference voltage VR is compared to the voltages VN of the nodes of the second board 200 (S1014). When at least one node of the second board 200 has a voltage VN lower than the reference voltage VR (which node will be referred to hereinafter as a "low voltage node NL"), a virtual through-silicon-via 300 is added at the node of the second board 200 having the lowest voltage (S1015). This latter node will be referred to hereinafter as the "lowest voltage node WNL". Then the relevant steps are repeated until there is no node whose voltage is lower than the reference voltage.

That is, when low voltage nodes NL exist on the boards, a virtual through-silicon-via 300 is placed on the lowest voltage node WNL. Subsequently, the voltages VN of all nodes on the first board 100 and the second board 200 are measured and compared to the reference voltage VR again. The virtual through-silicon-via 300 are added until the voltages VN, of all nodes on the first board 100 and the second board 200, are higher than the reference voltage VR. The number of virtual through-silicon-vias 300 is then recorded.

Next, the process (FIG. 3) is repeated by selecting another thickness of the board wiring 500 and another spatial interval of the board wiring 500 from the sets of predetermined values. Again, at the end of this process, the number of virtual through-silicon-vias 300 is noted. The process may be repeated until a count is made for all of the numbers of through-silicon-vias as a result of running the process of FIG. 3 for all values of the thicknesses and spatial intervals of the board wiring 500.

The board wiring determined (S1000 in FIG. 1) for implementing the power supply network of the semiconductor device 20 is that for the design that yields the lowest number of virtual through-silicon-vias 300. In this way when the through-silicon-vias 390 of the power supply network of the semiconductor device 20 are fabricated to correspond to the virtual through-silicon-vias 300 of the design, the number of through-silicon-vias is kept to a minimum.

Figure 5:
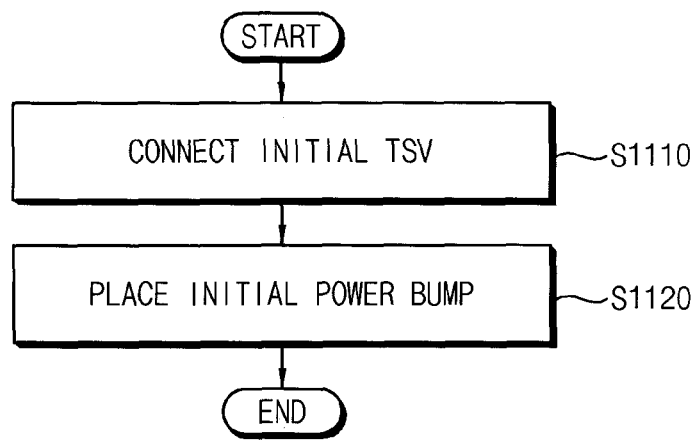
FIG. 5 is a flow chart illustrating an example of a process of creating an initial network structure of a semiconductor device in the method of FIG. 1.
Figure 6:
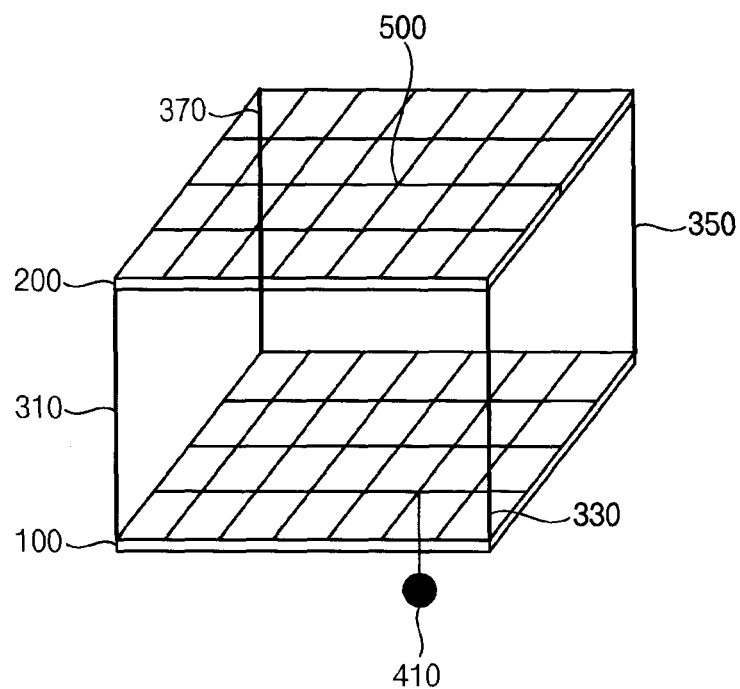
FIG. 6 is a schematic diagram of a structure created using the process of FIG. 5.

An example of the producing an initial network structure (S1100) in the method of FIG. 1 will now be described in more detail with reference to FIG. 5 and FIG. 6.

Edges of wiring on the first board 100 are connected to edges of wiring on the second board 200 by initial through-silicon-vias 310, 330, 350 and 370 (S1110). An initial power bump 410 is placed on one node of the first board 100 (S1120).

Figure 7:
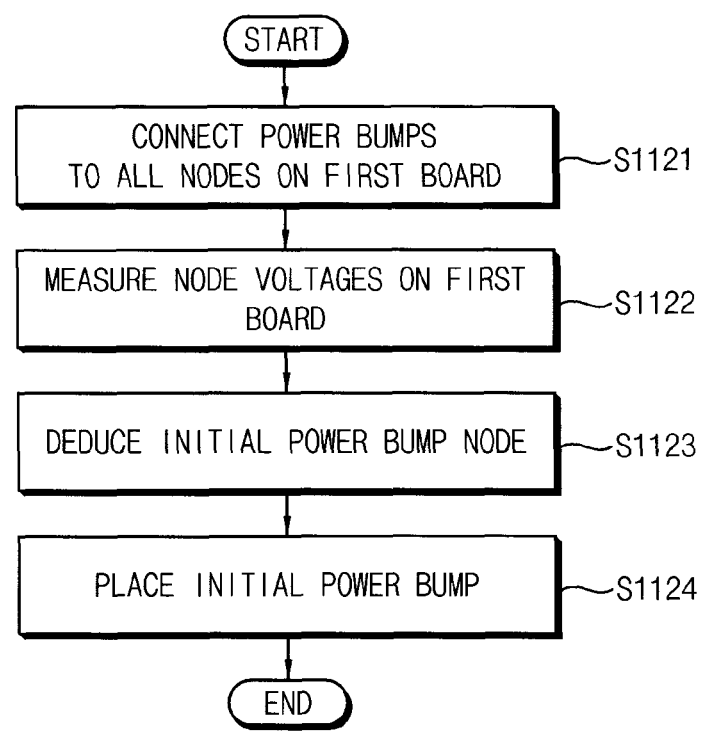
FIG. 7 is a flow chart of an example of a process of determining the node on which an initial power bump is place in the process of FIG. 5.

An example of the way in which the node that is to receive the initial power bump 410 is selected in the process of FIG. 5 will now be described with reference to FIG. 7 and FIG. 8.

The process of selecting the location of the initial power bump 410 of the first board 100 (S1120) entails connecting virtual power bumps 400 to all nodes of the first board 100 (S1121), in the same manner illustrated in FIG. 4. The voltages VN of all nodes on the first board 100 are measured (S1122). An initial power bump node IPBN is determined (S1123). The initial power bump node IPBN is the lowest voltage node WNL on the first board 100. The initial power bump 410 is connected to the initial power bump node IPBN (S1124).

An example of a semiconductor device 20 in which power bumps and through-silicon-vias are provided in accordance with the method of FIG. 1 will now be described with reference to FIG. 9.

If low voltage nodes were existent on the first board 100 of the initial network structure, a power bump 450 is connected to the first board 100 at the lowest voltage node WNL of the low voltage nodes NL. Thus, the IR drop in the low voltage node NL is compensated for by the power bump 450. The process is repeated, using a structure corresponding to initial network structure and the power bump 450, thereby adding another power bump 450 if any low voltage node still exists. The process is repeated until no low voltage nodes low exist on the first board 100.

On the other hand, if low voltage nodes exist on the second board 200 of the initial network structure, a through-silicon-via 390 is formed such that is connected to the lowest voltage node WNL of the second board 200 and the corresponding node of the first board 100. In this case, the IR drop in the low voltage node NL is compensated for by the through-silicon-via 390. The process is repeated, using a structure corresponding to initial network structure and the through-silicon-via 390, thereby adding another through-silicon-via 390 if any low voltage node still exists on the second board 200. The process is repeated until no low voltage nodes low exist on the second board 200.

Another embodiment of a method of manufacturing a 3D semiconductor device according to the inventive concept will be described with reference to FIGS. 9 and 10.

Figure 10:
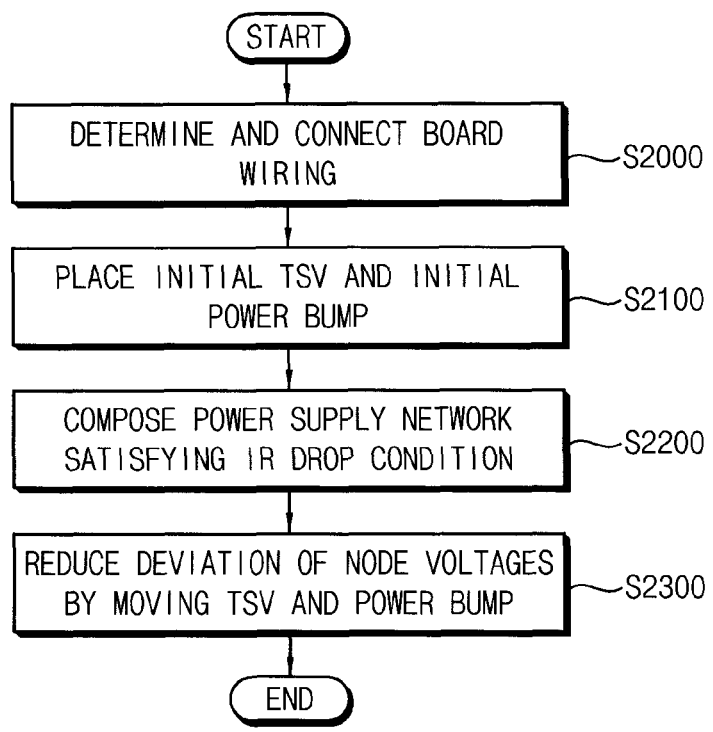
FIG. 10 is a flow chart illustrating another embodiment of a method of designing a power supply network of a semiconductor device according to the inventive concept.

Referring to FIG. 10, a power supply is designed taking into consideration deviation of voltages at the nodes of the board wiring 500.

The board wiring 500 of each of the boards (e.g., 100 and 200) is determined (S2000). An initial network structure is placed among the boards (S2100). Power bumps 450 and through-silicon-vias 390 are provided, in virtual form, until all nodes of the boards have voltages higher than a reference voltage VR (S2200). The power bumps 450 and the through-silicon-vias 390 in their virtual layout are rearranged to reduce deviation among the voltages VN of the nodes on the boards (S2300). The virtual layout of the power bumps 450 (and the through-silicon-vias 390) may be rearranged using a force-directed algorithm. In an example of such a force-directed algorithm, the power bumps 450 (through-silicon-vias 390) in their virtual layout are rearranged as if repulsive forces of the same magnitude were provided between the bumps (through-silicon vias), forcing the bumps (through-silicon vias) apart from one another, as confined within the perimeter of the board, and then connected to the closest nodes. Then a semiconductor device whose power supply network includes the power bumps 450 and through-silicon-vias laid out according to the design realized using the rearrangement process (S2300) is manufactured.

As a result, a device that operates highly stably can be realized.

According to an aspect of the inventive concept as described above, a method of manufacturing a semiconductor device includes designing the power supply network of the device taking into account the allowable thicknesses and spatial intervals of board wirings of the device. Therefore, a semiconductor device having an optimized power supply network may be realized according to the inventive concept. Also, a voltage drop problem is mitigated.

Finally, embodiments of the inventive concept and examples thereof have been described above in detail. The inventive concept may, however, be embodied in many different forms and should not be construed as being limited to the embodiments described above. Rather, these embodiments were described so that this disclosure is thorough and complete, and fully conveys the inventive concept to those skilled in the art. Thus, the true spirit and scope of the inventive concept is not limited by the embodiment and examples described above but by the following claims.

What is claimed is:

1. A method of manufacturing a three-dimensional (3D) semiconductor device having a plurality of boards stacked one atop the other, wherein each board includes a substrate and wiring integrated with the substrate, and the wiring of each board has a plurality of nodes, the method comprising:

determining board wiring for each of the boards;

devising an initial network structure among the boards having the determined board wiring, wherein the initial network structure electrically connects the boards in a configuration in which the boards are stacked one atop another;

composing a layout of a power supply network for the boards electrically connected by the initial network structure, the power supply network having power bumps disposed at respective nodes of the wiring of one of the boards and through-silicon-vias connecting respective nodes of the wiring of the boards, and wherein the boards when electrically connected by the initial network structure and provided with the power supply network satisfy a condition in which all of the nodes of the wiring of the boards have voltages higher than a reference voltage when a given voltage is applied to the boards using the power bumps; and fabricating a semiconductor device of the boards having the determined board wiring and stacked one atop the other, and having power bumps and through-silicon vias conforming to the layout of said power supply network.

2. The method of claim 1, wherein the determining of the board wiring includes determining a thickness and a spatial interval for the board wiring.

3. The method of claim 2, wherein determining the thickness and the spatial interval includes:

selecting a predetermined thickness and a predetermined spatial interval for the board wiring;

placing virtual power bumps on all nodes of the wiring of a first one of the boards and connecting at least one of the nodes of the wiring of the first board with a corresponding node of the wiring of a second one of the boards with a respective virtual through-silicon-via;

determining voltages of all nodes of the wiring of the second board that is connected to the first board through the virtual through-silicon-vias;

comparing the reference voltage to the voltages of all of the nodes of the wiring of the second board;

when at least one node of the wiring of the second board has a voltage lower than the reference voltage, connecting the first board to the second board by placing an additional virtual through-silicon-via at the node of the wiring of the second board having the lowest voltage among those whose voltages are less than the reference voltage; and repeating carrying out the determining of voltages of all nodes of the wiring of the second board, the comparing the reference voltage to the voltages of all of the nodes of the wiring of the second board and the placing of an additional through-silicon-via, when at least one node of the wiring of the second board has a voltage lower than the reference voltage.

4. The method of claim 1, wherein the devising of the initial network structure among the boards includes:

connecting edges of the wiring of a first one of the boards to edges of the wiring of a second one of the boards with initial through-silicon-vias; and placing an initial power bump on the first board at one node of the wiring of the first board.

5. The method of claim 4, wherein the placing of the initial power bump on the first board includes:

connecting virtual power bumps to all nodes of the wiring of the first board;

determining which node among all of the nodes of the wiring of the first board has the lowest voltage when a given voltage is applied to the first and second boards, and designating that node as an initial power bump node; and connecting the initial power bump to the first board at the initial power bump node.

6. The method of claim 4, wherein the composing of the layout includes when nodes of the wiring of the second board exist whose voltages are lower than the reference voltage when a given voltage is applied to the first and second boards, placing a through-silicon-via at the node of the wiring of second board whose voltage is lowest among those whose voltages are lower than the reference voltage.

7. The method of claim 4, wherein the composing of the layout includes when nodes of the wiring of the first board exist whose voltages are lower than the reference voltage when a given voltage is applied to the first and second boards, placing a power bump on the node of the wiring of the first board whose voltage is lowest among those whose voltages are lower than the reference voltage.

8. The method of claim 1, wherein the board wiring determined for each of the boards has the form of a lattice.

9. The method of claim 1, wherein the board wiring is determined so as to be the same for all of the boards.

* * * * *